(12) United States Patent
Chen et al.

(10) Patent No.: US 10,308,519 B2
(45) Date of Patent: Jun. 4, 2019

(54) METHOD FOR PREPARING ORGANIC ENVIRONMENT FRIENDLY SNOW-MELTING AGENT BY USING SALT MUD FROM TWO-ALKALI METHOD

(71) Applicant: CHINASALT JINTAN CO., LTD, Changzhou (CN)

(72) Inventors: Liuping Chen, Changzhou (CN); Junhui Xu, Changzhou (CN); Juntian Han, Changzhou (CN); Zhijun Su, Changzhou (CN); Yaoxing Cui, Changzhou (CN); Cuiting Leng, Changzhou (CN)

(73) Assignee: CHINASALT JINTAN CO., LTD, Changzhou (CN)

( * ) Notice: Subject to any disclaimer, the term of this patent is extended or adjusted under 35 U.S.C. 154(b) by 0 days.

(21) Appl. No.: 16/072,885

(22) PCT Filed: Jul. 21, 2017

(86) PCT No.: PCT/CN2017/093783
§ 371 (c)(1),
(2) Date: Jul. 26, 2018

(87) PCT Pub. No.: WO2018/040782
PCT Pub. Date: Mar. 8, 2018

(65) Prior Publication Data
US 2019/0031523 A1 Jan. 31, 2019

(30) Foreign Application Priority Data
Aug. 28, 2016 (CN) .......................... 2016 1 0762169

(51) Int. Cl.
*C09K 3/18* (2006.01)
*C01F 11/18* (2006.01)

(52) U.S. Cl.
CPC .............. *C01F 11/185* (2013.01); *C09K 3/18* (2013.01); *C09K 3/185* (2013.01); *C01P 2004/30* (2013.01); *C01P 2004/61* (2013.01)

(58) Field of Classification Search
CPC .... C09K 3/185; C01F 11/185; C01P 2004/30; C01P 2004/61
See application file for complete search history.

(56) References Cited

FOREIGN PATENT DOCUMENTS

| CN | 102690632 A | 9/2012 | |
|----|-------------|--------|---|
| CN | 103788928 A | 5/2014 | |
| CN | 104355984 A | 2/2015 | |
| CN | 105112017 A | 12/2015 | |
| CN | 106398649 A * | 2/2017 | ............... C09K 3/18 |
| CN | 106497517 A | 3/2017 | |
| WO | WO-2018040783 A1 * | 3/2018 | ............... C09K 3/18 |

OTHER PUBLICATIONS

Guo-Jun Lu et al. "Alkali salt mud application in environmental protection", China Chlor-Alkali, vol. 2, Feb. 28, 2014. ISSN: 1009-1785, p. 8.

* cited by examiner

*Primary Examiner* — Anthony J Green
(74) *Attorney, Agent, or Firm* — Gokalp Bayramoglu

(57) ABSTRACT

Disclosed is a method for preparing an organic environment-friendly snow-melting agent by using salt mud from a two-alkali method, relates to the field of environmental protection and resource utilization of solid wastes. The method includes the following steps: first, stirring and reacting an organic acid and the salt mud from a two-alkali method at room temperature to obtain a slurry; filtering the slurry to obtain a filtrate; the filtrate is then concentrated and dried by centrifugal spray drying to obtain a solid powder; granulating the solid powder. The method not only realizes the recycling of salt mud solid waste, but also greatly reduces the production cost of organic environment-friendly snow melting agent by turning waste into wealth, moreover, due to the existence of trace ions, the ability of melting snow and ice has obvious synergistic effect.

6 Claims, No Drawings

METHOD FOR PREPARING ORGANIC ENVIRONMENT FRIENDLY SNOW-MELTING AGENT BY USING SALT MUD FROM TWO-ALKALI METHOD

CROSS REFERENCE TO RELATED APPLICATIONS

This application is the national phase entry of International Application No. PCT/CN2017/093783, filed on Jul. 21, 2017, which is based upon and claims priority to Chinese Patent Application No. 201610762169.X filed on Aug. 28, 2016, the entire contents of which are incorporated herein by reference.

TECHNICAL FIELD

The invention relates to the technical field of environmental protection and resource utilization of solid wastes, and more particularly relates to a method for preparing an organic environment friendly snow-melting agent by using salt mud from a two-alkali method.

BACKGROUND

Snow in winter is the "enemy" of traffic. In the 1940s and 1950s, with the rapid development of transportation, snow-melting agents came into being. Snow-melting agents are mainly used in airports, highways, railways, urban streets and other places to remove snow or prevent freezing.

Chlorine salt snow-melting agents have been widely used in road snow removal and ice melting because of their good snow-melting effect and low price. Until now, some countries still use chlorine salts as the main components of snow melting agents, and China is no exception. However, excessive use of chlorine salt snow-melting agents leads to a large number of damage to roadside vegetation, and corrosion of roads, bridges and concrete roads, the snow mixed with chlorine salt snow-melting agents melt and then infiltrate into the surface, and contaminate rivers and groundwater, causing serious damage to the ecological environment. Therefore, it is imperative to study new types of snow-melting agents and improve the performance of existing snow-melting agents.

In the late 1980s and early 90s, the study of acetate snow-melting agents were started abroad, and the appearance of calcium magnesium acetate has made a breakthrough in the acetate snow-melting agents. The calcium magnesium acetate (CMA) is a mixture of calcium acetate and magnesium acetate, an environment friendly chemical developed in the United States in the 1980s as an alternative to the snow or ice removal agent sodium chloride in the freeway. Compared with sodium chloride, CMA has the advantages of low melting point, biodegradability, less corrosion to concrete and metal in highway infrastructure, and basically no pollution to soil and water sources. Usually, CMA is produced by the reaction of glacial acetic acid with dolomite, but this method has high production cost, and the price of CMA is 30 times higher than that of sodium chloride, which restricts the common application of CMA.

Brine purification process is a key process in salt industry to improve the purity of refined salt products, reduce the impurity content in salt and improve the whiteness of salt products. The chemical composition of the salt mud produced by the two-alkali brine purification process includes $CaCO_3$, $Mg(OH)_2$, and a small amount of NaCl and $CaSO_4$, etc. Due to the large output and complex composition, direct emissions will cause environmental pollution. At present, most domestic enterprises treat salt mud as landfill waste. At present, the research and development of reasonable salt mud treatment industrial application technology is a technical problem faced by all salt making enterprises in China.

SUMMARY

The present invention provides a method for preparing an organic environment-friendly snow-melting agent by using a salt mud from a two-alkali method, which not only can reduce the processing cost of salt mud, but also can make full use of resources and turn waste into wealth, and reduce the production cost of the environment-friendly snow-melting agent and make full use of the trace components in the salt mud to further improve the usability of the snow-melting agent. The technical scheme adopted by the present invention is as follows:

reacting the salt mud from a two-alkali method with an organic acid to obtain a slurry; filtering the slurry to obtain a filtrate; the filtrate is then concentrated, dried by centrifugal spray drying, and granulated in sequence to obtain the organic environment-friendly snow-melting agent.

The specific steps are as follows:

(1) Stirring and reacting the organic acid and the salt mud at room temperature (25° C.);

a composition of the salt mud is calculated based on weight parts: 85-95 weight parts of $CaCO_3$, 0.5-1.5 weight parts of NaCl, 8.5-13.2 weight parts of $Mg(OH)_2$, 1.5-4.0 weight parts of $CaSO_4$, 0.5-1.5 weight parts of $Fe(OH)_3$, 0.5-1.0 weight parts of $Al(OH)_3$, 0.1-2.0 weight parts of $SiO_2$, (the composition or content other than silica in the original salt mud can be adjusted by conventional removal or addition when differing from the above criteria), the organic acid can be selected from one of formic acid, acetic acid, propionic acid, pyroligneous acid or other organic waste acid, preferably formic acid, acetic acid or other organic waste acid, a specific operation is to disperse the salt mud into the slurry in water, and then add the organic acid to the slurry under stirring until no bubbles appear in the slurry.

The bubbles produced by the above reaction are carbon dioxide gas, which can be collected and used as by-products.

(2) Filtering the slurry obtained in step (1) to obtain the filtrate, the filtrate is then concentrated under reduced pressure and dried by centrifugal spray drying to obtain a solid powder, when concentrated under reduced pressure, a vacuum degree is in a range of 0.06-0.09 MPa and a temperature is in a range of 70-80° C. A liquid product (including decoloration or non-decoloration) obtained after the vacuum concentration can be used as a liquid organic environment-friendly snow-melting agent.

(3) Granulating the solid powder obtained in step (2) to obtain the organic environment-friendly snow-melting agent in a particle size of 4-7 mm and a shape of ellipsoidal. It is proposed for the first time that an organic environment-friendly snow melting agent can be prepared by reacting the two alkaline salt muds produced during the purification of brine and organic acids.

The beneficial effects of the present invention are as follows: for the first time, the organic environment-friendly snow-melting agent is prepared by the reaction of salt mud prepared in a brine purification process and organic acid, the calcium and magnesium ions in salt mud are fully utilized, and the ability of melting snow and ice is enhanced by the existence of trace ions; the present invention realizes the recycling of the solid waste of the salt mud, turns the waste into wealth, greatly reduces the production cost of the organic environment-friendly snow-melting agent, saves the treatment cost of the salt mud and reduces the environmental pollution.

The prepared CMA type snow-melting agent is a kind of environment-friendly chemical recognized in the market, compared with sodium chloride snow-melting agents, CMA has the advantages of low melting point, biodegradability, less corrosion to concrete and metal in highway infrastructure, and basically no pollution to soil and water sources. The present invention is in line with the national guidelines for energy-saving, emission reduction and environmental protection.

DETAILED DESCRIPTION

Embodiment 1

The composition of the salt mud from the two-alkali method is calculated based on weight parts: 94.5 weight parts $CaCO_3$, 1.2 weight parts of NaCl, 29.5 weight parts of $Mg(OH)_2$, 2.5 weight parts of $CaSO_4$, 0.7 weight parts of $Fe(OH)_3$, 0.9 weight parts of $Al(OH)_3$ and 2.0 weight parts of $SiO_2$.

(1) Stirring and dispersing the above salt mud containing 500 g $CaCO_3$ in 500 mL of water at room temperature (25° C.) into a slurry, and then adding pure acetic acid to the slurry under stirring until no bubbles appeared in the slurry.

(2) Filtering the slurry obtained in step (1) to obtain the filtrate, the filtrate was then concentrated under reduced pressure at 0.06 MPa and 75° C., and dried by centrifugal spray drying to obtain the solid powder.

(3) Roller granulating the solid powder to obtain the organic environment-friendly snow-melting agent in a particle size of 4-6 mm and a shape of ellipsoidal.

Embodiment 2

The composition of the salt mud is calculated based on weight parts: 93 weight parts of $CaCO_3$, 0.8 weight parts of NaCl, 10 weight parts of $Mg(OH)_2$, 3.2 weight parts of $CaSO_4$, 0.85 weight parts of $Fe(OH)_3$, 0.8 weight parts of $Al(OH)_3$, 0.5 weight parts of $SiO_2$.

(1) Stirring and dispersing the above salt mud containing 500 g $CaCO_3$ in 500 mL of water at room temperature (25° C.) into a slurry and then adding pure formic acid to the slurry under stirring until no bubbles appeared in the slurry.

(2) Filtering the slurry obtained in step (1) to obtain the filtrate, the filtrate was then concentrated under reduced pressure at 0.07 MPa and 80° C., and dried by centrifugal spray drying to obtain the solid powder.

(3) Roller granulating the solid powder obtained in step (2) to obtain the organic environment-friendly snow-melting agent in a particle size of 4-6 mm and a shape of ellipsoidal.

Comparative Embodiment 1

The amounts of $CaCO_3$, NaCl, $Mg(OH)_2$, $CaSO_4$, and $SiO_2$ in the salt mud were added as the amounts of Embodiment 1 in pure form.

(1) Stirring and dispersing the mixture containing 500 g $CaCO_3$ and the composition based on weight parts of 94.5 weight parts of $CaCO_3$, 1.2 weight parts of NaCl, 9.5 weight parts of $Mg(OH)_2$, 2.5 weight parts of $CaSO_4$, 2.0 weight parts of $SiO_2$ in 500 mL of water at room temperature (25° C.) into a slurry, and then adding pure acetic acid to the slurry under stirring until no bubbles appeared in the slurry.

(2) Filtering the slurry obtained in step (1) to obtain the filtrate, the filtrate was then concentrated under reduced pressure at 0.06 MPa and 75° C., and dried by centrifugal spray drying to obtain the solid powder.

(3) Roller granulating the solid powder obtained in step (2) to obtain the organic environment-friendly snow-melting agent in a particle size of 4-6 mm and a shape of ellipsoidal.

Comparative Embodiment 2

The amounts of $CaCO_3$, NaCl, $Mg(OH)_2$, $CaSO_4$, and $SiO_2$ in the salt mud were added as the amounts of Embodiment 2 in pure form:

(1) Stirring and dispersing the mixture containing 500 g $CaCO_3$ and the composition based on weight parts of 93 weight parts of $CaCO_3$, 0.8 weight parts of NaCl, 10 weight parts of $Mg(OH)_2$, 3.2 weight parts of $CaSO_4$, 0.85 weight parts of $Fe(OH)_3$, 0.5 weight parts of $SiO_2$ in 500 mL of water at room temperature (25° C.) into a slurry, and then adding pure formic acid to the slurry under stirring until no bubbles appeared in the slurry.

(2) Filtering the slurry obtained in step (1) to obtain the filtrate, the filtrate was then concentrated under reduced pressure at 0.07 MPa and 80° C., and dried by centrifugal spray drying to obtain the solid powder.

(3) Roller granulating the solid powder obtained in step (2) to obtain the organic environment-friendly snow-melting agent in a particle size of 4-6 mm and a shape of ellipsoidal.

Comparative Embodiment 3

On the basis of Embodiment 1, adding the content of $Fe(OH)_3$ and the content of $Al(OH)_3$, the composition of the salt mud is calculated based on weight parts of 94.5 weight parts of $CaCO_3$, 1.3 weight parts of NaCl, 9.5 weight parts of $Mg(OH)_2$, 2.5 weight parts of $CaSO_4$, 5 weight parts of $Fe(OH)_3$, 4 weight parts of $Al(OH)_3$, 2.0 weight parts of $SiO_2$.

(1) Stirring and dispersing the above salt mud containing 500 g $CaCO_3$ in 500 mL of water at room temperature (25° C.) into a slurry, and then adding pure acetic acid to the slurry under stirring until no bubbles appeared in the slurry.

(2) Filtering the slurry obtained in step (1) to obtain the filtrate, the filtrate was then concentrated under reduced pressure at 0.06 MPa and 75° C., and dried by centrifugal spray drying to obtain the solid powder.

(3) Roller granulating the solid powder obtained in step (2) to obtain the organic environment-friendly snow-melting agent in a particle size of 4-6 mm and a shape of ellipsoidal.

Comparative Embodiment 4

The amounts of $CaCO_3$, NaCl, $Mg(OH)_2$, $CaSO_4$, $Al(OH)_3$ and $SiO_2$ in the salt mud were added as the amounts of Embodiment 2 in pure form:

(1) Stirring and dispersing the mixture containing 500 g $CaCO_3$ and the composition based on weight parts of 93 weight parts of $CaCO_3$, 0.8 weight parts of NaCl, 10 weight parts of $Mg(OH)_2$, 3.2 weight parts of $CaSO_4$, 0.8 weight parts of $Al(OH)_3$, 0.5 weight parts of $SiO_2$ in 500 mL of water at room temperature (25° C.) into a slurry, and then adding pure formic acid to the slurry with stirring until no bubbles appeared in the slurry.

(2) Filtering the slurry obtained in step (1) to obtain the filtrate, the filtrate was then concentrated under reduced pressure at 0.07 MPa and 80° C., and dried by centrifugal spray drying to obtain the solid powder.

(3) Roller granulating the solid powder obtained in step (2) to obtain the organic environment-friendly snow-melting agent in a particle size of 4-6 mm and a shape of ellipsoidal.

Test Experiment 1

Corroding metal carbon steel by organic environment-friendly snow-melting agent:

First, the corrosion solutions were prepared, the sodium chloride (purity≥99.9%) and the organic environment-friendly snow-melting agent in embodiment 1, embodiment 2, comparative embodiment 1, comparative embodiment 2, comparative embodiment 3, and comparative embodiment 4 were added to seven 2000 mL beakers respectively, then water was added to prepare test solutions of a solute mass fraction of 18.0%.

The samples were rectangular carbon steel sheets NO. 20 (GB/T699) in the size of 5 mm×2.5 mm×0.2 mm, before the test, the surface oil of the samples was wiped off with filter paper, then the samples were dried after soaking in acetone and anhydrous ethanol, and finally wrapped in filter paper respectively and placed in a desiccator for later use. After the start of the experiment, each sample was accurately weighed with an analytical balance and then soaked in the above-mentioned corresponding numbered corrosion solution, the experimental temperature was 40° C., and the linear speed of the test strips was 0.35 m/s. Air was not inlet in the soaking process, the surface rust was wiped off after continuous soaking for 48 hours, excess water was removed by using absolute ethanol after acid washing, alkali washing and water washing, the samples were dried and weighed again, the corrosion inhibition rate was measured according to the corrosion reduction, and the calculation formula of the corrosion rate is as follows:

$$X = \frac{8760 \times (m - m_1) \times 10}{s \times \rho \times t}$$

In the above formula, m is the final mass loss of the quality of the test strips soaked in the corrosion solution prepared above, unit g; $m_1$ is the average mass loss of the quality of the test strips after the acid washing, alkali washing, water washing and absolute ethyl alcohol washing, unit g;

s was the surface area of the test strips, unit cm²; p is the density of the test strips, unit g/cm³; t is the test time, unit h; 8760 is the number of hours equivalent to 1 year, unit h/a; 10 is the number of millimeters equal to 1 cm;

The corrosion inhibition rate $X_2$ of each sample is calculated by the corrosion rate measured by the above formula (the specific detection and calculation results are shown in table 1):

$$X_2(\%) = \frac{X_0 - X_1}{X_0} \times 100$$

In the formula: $X_0$ is the corrosion rate of the sodium chloride corrosion test solution prepared above to the test strip, unit mm/a;

$X_i$ is the corrosion rate of the corrosion test solutions prepared by the finished products of the above embodiments and comparative embodiments to the test strips, unit mm/a.

TABLE 1

|  | Sodium chloride | Embodiment 1 | Embodiment 2 | Comparative Embodiment 1 | Comparative Embodiment 2 | Comparative Embodiment 3 | Comparative Embodiment 4 |
| --- | --- | --- | --- | --- | --- | --- | --- |
| Corrosion rate | 0.5058 | 0.0756 | 0.0701 | 0.1385 | 0.1276 | 0.1162 | 0.1289 |
| Corrosion inhibition rate | / | 85.05% | 86.14% | 72.62% | 74.77% | 77.03% | 74.52% |

It can be seen from the corrosion results of carbon steel in Table 1 that the organic environment-friendly snow-melting agent of the present invention can significantly reduce the corrosion of standard carbon steel sheets, and the corrosion rate of sodium chloride to carbon steel is several times that of the organic snow-melting agent of the present invention; and the corrosion inhibition effect of the product of comparative embodiments are worse than that of the present invention.

Test Experiment 2

Ice Melting Speed of the Organic Environment-Friendly Snow-Melting Agent:

According to the test method of snow and ice melting ability in the national standard of snow-melting salt, 200 g organic environment-friendly snow-melting agent products in embodiment 1, embodiment 2, comparative embodiment 1, comparative embodiment 2, comparative embodiment 3 and comparative embodiment 4 were weighed and placed in six 400 ml beakers respectively, and then were transferred to six 1000 ml volumetric flasks after dissolving in water, and then were shaken up and set for later use; the test solutions of the snow-melting agent products of embodiment 1, embodiment 2, comparative embodiment 1, comparative embodiment 2, comparative embodiment 3, and comparative embodiment 4 in each volumetric flask were sequentially marked as: test solution 1, test solution 2, test solution 3, test solution 4, test solution 5, test solution 6;

six 150 mL sample vials of the same diameters and heights were taken and added 100 mL of water and placed in a cryostat at −10° C. to fully freeze; 25 mL of the above-mentioned test solutions 1, 2, 3, 4, 5, 6 were respectively moved into six 50 mL beakers and placed in a cryostat at −8° C. for 12 h for later use;

the fully frozen sample vials were removed from the cryostat and weighed quickly (accurate to 0.1 g) after wiping the water and ice on the outer wall thereof, the standby test solutions 1, 2, 3, 4, 5, 6 were poured into the sample vials containing ice cubes one to one immediately, then the sample vials were put back into the cryostat at −10° C., and were taken out in 20 minutes, 40 minutes and 60 minutes respectively, the liquids in the sample vials were poured immediately, and the mass of the beakers and remaining ice cubes were weighed quickly, then pour the liquids back into the original sample vial, the obtained data of ability of melting snow and ice at each time period are shown in table 2:

TABLE 2

| | Time (minutes) | | | | | | | |
|---|---|---|---|---|---|---|---|---|
| | 0 | | 20 | | 40 | | 60 | |
| | Weight of ice | Weight of melting ice | Weight of ice | Weight of melting ice | Weight of ice | Weight of melting ice | Weight of ice | Weight of melting ice |
| Embodiment 1 | 100 | 0 | 89.8 | 10.2 | 77.5 | 22.5 | 65.6 | 34.4 |
| Embodiment 2 | 100 | 0 | 90.2 | 9.8 | 78.6 | 21.4 | 66.9 | 33.1 |
| Comparative embodiment 1 | 100 | 0 | 96.2 | 3.8 | 91.3 | 8.7 | 86.7 | 13.3 |
| Comparative embodiment 2 | 100 | 0 | 96.1 | 3.9 | 91.4 | 8.6 | 86.8 | 13.2 |
| Comparative embodiment 3 | 100 | 0 | 95.9 | 4.1 | 91.3 | 8.7 | 86.5 | 13.5 |
| Comparative embodiment 4 | 100 | 0 | 96.2 | 3.8 | 91.5 | 8.5 | 86.9 | 13.1 |

It can be seen that the co-existence of trace iron and aluminum can greatly improve the snow and ice melting effect by cooperating with the main components of the snow melting agent.

According to comparative embodiment 3, when the contents of Fe and Al elements are too high, the snow-melting effect is poor.

Test Experiment 3

Freezing Point Test of the Organic Environment-Friendly Snow-Melting Agent:

Sodium chloride (purity≥99.9%) and the organic environment-friendly snow melting agent products in embodiments 1, 2 and comparative embodiments 1, 2, 3, 4 were added into seven beakers respectively, water was added to prepare test solutions of a solute mass fraction of 18.0%. 70.0 ml of each test solution was removed and measured according to the requirements of SH/T 0090, and tested by B SY-188Z engine coolant freezing point tester, the result are shown in table 3.

TABLE 3

| | Sodium chloride | Embodiment 1 | Embodiment 2 | Comparative embodiment 1 | Comparative embodiment 2 | Comparative embodiment 3 | Comparative embodiment 4 |
|---|---|---|---|---|---|---|---|
| Freezing point/° C. | −14.3 | −19.2 | −19.7 | −8.3 | −8.8 | −9.1 | −8.6 |

From the test data of each comparative embodiment, the freezing point of the salt snow-melting agent of the conventional carboxylic acid calcium magnesium is higher than that of the snow-melting agent of the sodium chloride, which is one aspect that the salt snow-melting agent of carboxylic acid calcium magnesium is inferior to the conventional sodium chloride; however, in the present application, the freezing point of the salt snow-melting agent of carboxylic acid calcium magnesium doped with the related trace elements reduces significantly.

We claim:

1. A method for preparing an organic environment-friendly snow-melting agent by using a salt mud from a two-alkali method, comprising:
   reacting the salt mud with an organic acid to obtain a slurry;
   filtering the slurry to obtain a filtrate; wherein the filtrate is then concentrated, dried by centrifugal spray drying, and granulated in sequence to obtain the organic environment-friendly snow-melting agent and wherein the method comprises following specific steps:
   (1) stirring and reacting the organic acid and the salt mud at room temperature to obtain the slurry;
   (2) filtering the slurry obtained in step (1) to obtain the filtrate, the filtrate is then concentrated under reduced pressure and dried by centrifugal spray drying to obtain a solid powder;
   (3) granulating the solid powder obtained in step (2) to obtain the organic environment-friendly snow-melting agent;
   a composition of the salt mud in step (1) is calculated based on weight parts: 85-95 weight parts of $CaCO_3$, 0.5-1.5 weight parts of NaCl, 8.5-13.2 weight parts of $Mg(OH)_2$, 1.5-4.0 weight parts of $CaSO_4$, 0.5-1.5 weight parts of $Fe(OH)_3$, 0.5-1.0 weight parts of $Al(OH)_3$ and 0.1-2.0 weight parts of $SiO_2$.

2. The method for preparing the organic environment-friendly snow-melting agent according to claim 1, wherein the organic acid in step (1) is selected from one of formic acid, acetic acid, propionic acid or pyroligneous acid.

3. The method for preparing the organic environment-friendly snow-melting agent according to claim 1, wherein a specific operation in step (1) is to disperse the salt mud into the slurry in water, and then add the organic acid to the slurry under stirring until no bubbles appear in the slurry.

4. The method for preparing the organic environment-friendly snow-melting agent according to claim 1, wherein a particle size of the salt mud in step (1) is in a range of 30-85 μm.

5. The method for preparing the organic environment-friendly snow-melting agent according to claim 1, wherein when concentrated under reduced pressure, a vacuum degree is in a range of 0.06-0.09 MPa and a temperature is in a range of 70-80° C.

6. The method for preparing the organic environment-friendly snow-melting agent according to claim 1, wherein the solid powder is subjected to roller granulation in step (3) to obtain the organic environment-friendly snow-melting agent in a particle size of 4-7 mm and a shape of ellipsoidal.

* * * * *